UNITED STATES PATENT OFFICE.

LUDWIG OTTO HELMERS, OF HAMBURG, GERMANY, ASSIGNOR TO THE ICHTHYOL-GESELLSCHAFT, CORDES, HERMANNI & COMPANY, OF SAME PLACE.

PURIFYING SULFUR COMPOUNDS OF MINERAL OILS.

SPECIFICATION forming part of Letters Patent No. 525,784, dated September 11, 1894.

Application filed April 5, 1893. Serial No. 469,192. (No specimens.)

*To all whom it may concern:*

Be it known that I, LUDWIG OTTO HELMERS, doctor of philosophy, a subject of the German Emperor, residing at Hamburg, in the German Empire, have invented certain new and useful improvements in decomposing the neutralized reaction mixture obtained by the action of sulfonic acid on mineral or similar oils, particularly on hydrocarbons artificially or naturally sulfureted, into sulfonic acid compounds and sulfone-like compounds under simultaneous separation of the inorganic salts, of which the following is a specification.

My invention has relation to the purification of sulfonized carbon compounds, obtained by the action of sulphuric acid or its substitutes on mineral or similar oils, and to the separation of said sulfonized carbon compounds, now recognized as valuable therapeutic agents, into sulfonic acid salts *per se* soluble in water and into sulfone like bodies, *per se* insoluble in water. The purification of these sulfonized bodies consists essentially in the elimination therefrom of the sulfuric acid employed in their production, or in the elimination therefrom of the salts of said acid when the reaction mixture has been neutralized by means of an alkali which purification has heretofore been effected in two ways, to wit: first, by dissolving the sulfonized product in water and then separating the same by means of a salt, as described in Letters Patent of the United States No. 318,662, of May 4, 1885; and, second, by dialysis. Both these methods present difficulties and disadvantages. In the purification according to the first method referred to all of the salt used in the salting out cannot be removed leaving the final product in a more or less impure state, while according to the second method the inorganic salt is not only diffused, but a certain proportion of the sulfonic acids or their salts are also diffused, entailing considerable loss of this valuable therapeutic agent, which loss also reduces the solubility in water of the final product, owing to the fact that the sulfone like bodies are *per se* insoluble in water, and become soluble only in the presence of sulfonic acids or their salts, so that the degree of solubility in water of the sulfonized carbon compounds will depend upon the proportion of sulfonic acids present. With the exception of water there is so far as I know no solvent that will completely dissolve these sulfonized carbon-compounds. There are solvents, however, that will readily dissolve individual constituents of said compounds. Thus, for instance, alcohol (methylic, ethylic or other alcohols) will readily dissolve the sulfonic acid salts, while chloroform, benzene (coal tar benzol), and other like bodies will readily dissolve the sulfone like bodies, and my invention lies in the use of two of these solvents, either collectively, for the purpose of separating the inorganic salts from the carbon compounds by completely dissolving the latter substances, or separately, for the purpose of separating the sulfonized carbon compounds into sulfonic acid salts and sulfone like bodies. Said mixture of two solvents, that is to say, a mixture which is capable of dissolving all of the carbon constituents, namely, the sulfonic acid salts as well as the sulfone like bodies, I may term a compound solvent. For instance, if an aqueous solution of the reaction mixture obtained by the action of sulfuric acid upon naturally or artificially sulfureted mineral oils, is first neutralized by means of an alkali, then freed from as much of the water as possible, as by evaporation, and then treated with a mixture of alcohol (ethylic or other alcohols) and chloroform, or alcohol and benzene (coal tar benzol), all of the sulfonized carbon constituents referred to will be dissolved out, leaving the iorganic salts behind, they being insoluble in said compound solvent, the carbon compounds being obtained in a pure state, and may then be freed from the solvent by distillation or evaporation.

From this purified sulfonized carbon-compounds the sulfonic acid salts may be readily separated from the sulfone like bodies, or vice versa, by means of a solvent of the sulfone like bodies, as chloroform, benzene, or the like, or the sulfonic acid salts may be separated by means of a solvent thereof, as ethylic alcohol. Of course the removal of the inorganic salts and the separation of the carbon compounds may be carried out at the same time. In this case the neutralized reaction mixture is treated either first with alcohol, by which the sulfonic acid salts are dissolved out, and then the residue with benzene, by which the sulfone like bodies are extracted while the inorganic salts remain undissolved; or the neutralized reaction mixture is treated first with benzene, by which the sulfone like bodies are dissolved, and then the residue with alcohol by which the sulfonic acid salts are extracted, while the inorganic salts again remain undissolved. On the other hand the separation into sulfonic acid salts, sulfone like bodies, and the inorganic salts may be effected by alcohol alone, in view of the fact that the sulfone like bodies become insoluble in water after separation therefrom of the sulfonic acid salts and as the inorganic salts are soluble in water the latter can readily be removed from the sulfone like bodies by washing with water. This latter method I prefer as being the most simple and expeditious and of especial advantage because highly inflammable liquids, as benzene, or liquids that are detrimental to health, as chloroform, are entirely avoided.

From what has been said above it will be understood that it is necessary that the neutralizing or saturating salt employed should be insoluble in the solvents referred to so that only such alkalies can be used as will form with the sulfuric acid, combinations or salts that are insoluble in said solvents, as for instance, potash, or soda, or ammonia. Yet sulfonic acid salts, as the lithium salt, may be produced without first obtaining the pure free acid, as for instance, by acidifying the cleaned sulfonic acid soda with the aid of hydrochloric acid—and in this case the following process may be employed: The primary reaction mixture, that is to say, the product of the reaction resulting from the treatment with sulfuric acid of a mineral oil is first neutralized by means of lithium carbonate, then salted out repeatedly by means of a salt insoluble in alcohol, as sodium chloride, after which the water is removed, whereby the lithium sulfate is also removed, leaving only common salt in the sulfonized compound, which latter may be removed from the lithium salt of the sulfonic acids as above described. Instead of sodium chloride, ammonium sulfate or the like may be employed for the salting out.

As an example of the mode of carrying out my invention I will describe the same in its application to the purification of the well known sulfonized carbon compound, ichthyol, and to the separation of its sulfonic acid salts and sulfone like constituents.

The product resulting from the reaction of sulfuric acid upon Seefeld mineral oil after being freed from excess of acid as much as possible in a well known manner, and after separation from the non-sulfonized hydrocarbons by means of petroleum-ether, is neutralized with an alkali, as soda, for instance. The solution is then evaporated and all of the carbon constituents (sulfonic acid salts, and sulfone like bodies) are dissolved out by means of a compound solvent consisting of alcohol and chloroform, for instance, the inorganic salt, sodium sulfate remaining behind, since it is insoluble in said compound solvent. The said solvent is then eliminated by evaporation or distillation from the sulfonized carbon constituents, which latter are thus obtained in a pure form.

If it is desired to separate the sulfonic acid salts from the sulfone like bodies, the carbon compound thus obtained is treated either with a solvent of the sulfone like bodies, such as chloroform, or with an alcohol as a solvent of the sulfonic acid salts as above set forth. This separation may, however, be more advantageously effected simultaneously with the purification of the ichthyol as follows: The neutral ichthyol is first treated with ethylic alcohol, the proportion of the latter by weight being preferably about twice that of the material treated. By the application of heat the process of dissolution is accelerated. The alcoholic liquid after some time decanted, contains all sulfonic acid salts dissolved and is freed from the alcohol by distillation. The sulfonic acid alkali salts now remain as brown bodies which when dry can be readily pulverized. They are highly hygroscopic, have a bitter taste and weak smell and are readily soluble in water. The insoluble residue, remaining after extracting the ichthyol by alcohol as above described and consisting of sulfone like bodies and the inorganic salts, is washed out repeatedly by warm water, until all inorganic salts are removed. The sulfone like compounds remaining are dried at 100° centigrade and are then obtained in the form of dark colored inodorous bodies, which can be pulverized. They are readily soluble in any of the solvents above described, little soluble in absolute alcohol, nearly insoluble in diluted alcohol and entirely insoluble in water, but they become readily soluble in water when combined with the sulfonic acid alkali salts.

Having thus described my invention, what I claim as new therein, and desire to secure by Letters Patent, is—

1. The process of purifying sulfonized carbon compounds obtained by the action of sulfuric acid or its substitutes on mineral and similar oils, which consists in neutralizing the reaction mixture with an alkali, separating the carbon compounds from the inorganic salts by dissolving out said carbon constituents by means of solvents in which the inorganic salts are insoluble, as a mixture of alcohol and benzene.

2. The process of purifying sulfonized carbon compounds obtained by the action of sulfuric acid or its substitutes on mineral and similar oils and separating said compounds, which consists in neutralizing the reaction mixture with an alkali, first dissolving out the sulfonic acid salts by means of a solvent that will not affect the sulfone like bodies and the inorganic salts, as alcohol, whereby said sulfone like bodies are rendered insoluble in water, and then removing the inorganic salts from the sulfone like bodies by washing out with water.

3. The process of purifying sulfonized carbon compounds obtained by the action of sulfuric acid or its substitutes on mineral and similar oils and separating said carbon compounds, which consists in neutralizing the reaction mixture with an alkali, first, dissolving out the sulfonic acid salts by means of a solvent that will not affect the sulfone like bodies and the inorganic salts, as alcohol, and then separating the sulfone like bodies from the inorganic salts by dissolving out said sulfone like bodies by means of a solvent in which the inorganic salts are insoluble, as benzene.

4. The process of purifying sulfonized carbon compounds obtained by the action of sulfuric acid or its substitutes on mineral and similar oils and separating the said carbon compounds, which consists in neutralizing the reaction mixture by means of an alkali, dissolving out the sulfone like bodies by means of a solvent in which the sulfonic acid salts and inorganic salts are insoluble, as benzene, and then dissolving out the sulfonic acid salts by means of a solvent in which said inorganic salts are insoluble, as alcohol.

In testimony that I claim the foregoing as my invention I have signed my name, in presence of two witnesses, this 16th day of March, 1893.

LUDWIG OTTO HELMERS.

Witnesses:
ALEXANDER SPECHT,
DIEDRICH PETERSEN.